United States Patent [19]

Hayden

[11] Patent Number: 4,746,692

[45] Date of Patent: May 24, 1988

[54] POLYOLEFIN COMPOSITIONS FOR USE WITH WATER SYSTEMS

[75] Inventor: Earl E. Hayden, Katy, Tex.

[73] Assignee: Shell Oil Company, Houston, Tex.

[21] Appl. No.: 859,979

[22] Filed: May 5, 1986

[51] Int. Cl.$^4$ ............................................. C08K 5/34
[52] U.S. Cl. ................................................ 524/100
[58] Field of Search ................ 524/100, 579; 525/240

[56] References Cited

U.S. PATENT DOCUMENTS

| | | | |
|---|---|---|---|
| 2,991,264 | 4/1961 | Monroe et al. | 260/32.6 |
| 3,207,735 | 9/1965 | Wijga | 260/93.7 |
| 3,207,738 | 9/1965 | Wijga | 260/93.7 |
| 3,422,059 | 1/1969 | Taylor et al. | 260/45.85 |
| 3,455,872 | 7/1969 | Beck | 260/41 |
| 3,573,240 | 3/1971 | Flanagan | 260/23 |
| 3,925,376 | 12/1975 | Chalmers et al. | 524/100 |
| 4,007,282 | 2/1977 | Mauz et al. | 424/308 |
| 4,049,654 | 9/1977 | Spivack | 544/221 |
| 4,052,364 | 10/1977 | Christidis et al. | 260/45.85 |
| 4,098,762 | 4/1978 | Miyata et al. | 260/45.7 |
| 4,255,303 | 3/1981 | Keogh | 260/23 |
| 4,320,209 | 3/1982 | Chatterjee | 525/6 |
| 4,321,334 | 3/1982 | Chatterjee | 524/579 |
| 4,322,503 | 3/1982 | Chatterjee | 524/229 |
| 4,532,165 | 7/1985 | Hashimoto et al. | 428/36 |
| 4,576,983 | 3/1986 | Chatterjee et al. | 524/101 |

FOREIGN PATENT DOCUMENTS

| | | |
|---|---|---|
| 148962 | 7/1985 | European Pat. Off. . |
| 59-221344 | of 1984 | Japan . |
| 59-197447 | of 1984 | Japan . |
| 60-124642 | of 1985 | Japan . |
| 60-130635 | of 1985 | Japan . |

*Primary Examiner*—Veronica P. Hoke
*Attorney, Agent, or Firm*—Wendy K. B. Buskop

[57] ABSTRACT

An improved polyolefin composition having improved resistance to deterioration in the presence of chlorinated and nonchlorinated water and having improved resistance to temperatures in the range of about 0° C. to about 110° C. consisting of a blend of:

(a) about 93 to about 99.5 percent by weight of an isotactic alpha olefin polymer having 2–6 carbon atoms;

(b) about 0.05 to about 0.50 percent by weight of a hindered amine U.V. stabilizer;

(c) about 0.05 to about 1.1 by weight of a hindered phenolic thermal stabilizer having a molecular weight above 530 and selected from the group consisting of:

1,3,5-trimethyl-2,4,6-tris(3,5-di-tert-butyl-4-hydroxybenzyl) benzene, octadecyl 3,5-di-tert-butyl-4-hydroxyhydrocinnamate, tetrakis[methylene(3,5-di-tert-butyl-4-hydroxy-hydro-cinnamate)]methane, 1,3,5-tris(4-tert-butyl-3-hydroxy-2,6-dimethylbenzyl)-1,3,5-triazine-2,4,6-(1H,3H,5H)-trione, bis-[3,3-bis(4'hydroxy-3'tert.butyl-phenyl)-butanoic acid]-glycolester, tris(3,5-di-t-butyl-4-hydroxybenzyl)isocyanurate and mixtures thereof;

(d) about zero to about 0.5 percent by weight of a nucleating agent;

(e) about zero to about 4 percent by weight of a pigment; and (f) about zero to about 3.0 percent by weight of a filler.

6 Claims, No Drawings

POLYOLEFIN COMPOSITIONS FOR USE WITH WATER SYSTEMS

FIELD OF THE INVENTION

The present invention is related to an improved polymeric composition resistant to ultraviolet light deterioration and useful in chlorinated and non-chlorinated, potable and non-potable water systems wherein the water temperatures range from about 0° C. to about 110° C.

BACKGROUND OF THE INVENTION

Olefinic polymeric compositions, particularly butene-1 polymeric compositions, have been used for many applications. It has been found that for many end uses, it is essential to combine the polymer with antioxidants and ultraviolet (UV) stabilizers in order to develop a resin composition capable of withstanding a variety of conditions, such as heat, oxygen, UV radiation, chlorinated water, or water with a temperature higher than room temperature. A polymeric composition has long been needed which is resistant to deterioration when exposed to hot oxygenated water having a temperature in the range of 23° C. to about 110° C., chlorinated water, and UV radiation. The present invention with an unusual blend of components meets this need and is a significant improvement in the art.

SUMMARY OF THE INVENTION

The present invention relates to an improved polyolefin composition having improved resistance to deterioration when exposed to hot oxygenated water with a temperature in the range of about 0° C. to 110° C., chlorinated water, and UV radiation. More specifically, the present invention relates to a polyolefinic composition comprising a blend of:

(a) about 93 to about 99.5 percent by weight of an isotactic alpha olefinic homopolymer or copolymer having 2 to 6 carbon atoms;

(b) about 0.05 to about 0.50 percent by weight of a hindered amine U.V. stabilizer;

(c) about 0.05 to about 1.1 by weight of a hindered phenolic thermal stabilizer having a molecular weight above 530 and selected from the group consisting of: 1,3,5-trimethyl-2,4,6-tris(3,5-di-tert-butyl-4-hydroxy-benzyl)benzene, octadecyl 3,5-di-tert-butyl-4-hydroxyhydrocinnamate, tetrakis[methylene(3,5-di-tert-butyl-4-hydroxy-hydro-cinnamate)]methane, 1,3,5-tris(4-tert-butyl-3-hydroxy-2,6-dimethylbenzyl)-1,3,5-triazine-2,4,6-(1H,3H,5H)-trione, bis-[3,3-bis(4'hydroxy-3'tert.butyl-phenyl)-butanoic acid]-glycolester, tris(3,5-di-t-butyl-4-hydroxybenzyl)isocyanurate, and mixtures thereof;

(d) about 0.05 to about 0.5 percent by weight of a nucleating agent;

(e) about zero to about 4 percent by weight of a pigment; and (f) about zero to about 3.0 percent by weight of a filler.

The present invention relates to the above-described blend wherein the hindered amine is an N,N'-bis(2,2,6,6-tetramethyl-4-piperidinyl)-1,6-hexane diamine polymer with 2,4,6-trichloro-1,3,5-triazine and 2,4,4-trimethyl-1,2-pentanamine.

The present invention also relates to a composition for use in either chlorinated or non-chlorinated fluid carrying systems, consisting of the blend described above.

Further, the present invention relates to water supplying pipes consisting essentially of a blend of:

(a) about 95.5 to about 99 percent by weight of an isotactic butene-1 homopolymer or copolymer;

(b) about 0.05 to about 0.5 percent by weight of N,N'-bis(2,2,6,6-tetramethyl-4-piperidinyl)-1,6-hexane diamine polymer with 2,4,6-trichloro-1,3,5-triazine and 2,4,4-trimethyl-1,2-pentanamine;

(c) about 0.05 to about 1.1 percent by weight of at least one hindered phenolic thermal stabilizer having a molecular weight above 530;

(d) about zero to about 0.4 percent by weight of a polyethylene nucleating agent;

(e) about zero to about 4 percent by weight of a pigment; and (f) about zero to about 3 percent by weight of a filler.

Finally, the present invention relates to a pipe composition with utility for a fluid carrying system, such as a potable hot water carrying system, having temperatures in the range of 23° C., to about 100° C. and which consists essentially of an intimate blend of:

(a) about 95 to about 99.5 percent by weight of an isotactic butene-1 homopolymer or copolymer;

(b) about 0.05 to about 0.5 percent by weight of N,N'-bis(2,2,6,6-tetramethyl-4-piperidinyl)-1,6-hexane diamine, polymer with 2,4,6-trichloro-1,3,5-triazine and 2,4,4-trimethyl-1,2-pentanamine;

(c) about 0.40 to about 0.75 of a mixture of 1,3,5-trimethyl-2,4,6-tris(3,5-di-tert-butyl-4-hydroxy-benzyl)-benzene and octadecyl 3,5-di-tert-butyl-4-hydroxyhydrocinnamate;

(d) about 0.1 to about 0.2 percent by weight of a high density polyethylene nucleating agent;

(e) about zero to about 2 percent by weight of a mixture of carbon black and titanium dioxide; and (f) about zero to about 1.5 percent by weight of a filler consisting of a magnesium silicate coated with a metal stearate.

This invention is directed to the combination of the ingredients and the particular use of the hindered amine light stabilizer as a thermal stabilizer in the blend. A significant aspect of the present invention is the synergism which results from combining the alpha olefin polymer having 2 to 6 carbon atoms, such as butene-1, with a particular hindered amine, at least one phenolic thermal stabilizer having a molecular weight over 530, and a nucleating agent, such as high density polyethylene, a pigment and a filler as described.

The resulting overall polymeric composition has an excellent, superior balance of properties not available in prior art formulations.

DETAILED DESCRIPTION OF THE INVENTION

This novel polymeric composition can be formulated from a variety of alpha olefinic homopolymers or copolymers having from 2 to 6 carbon atoms, but it is most successful with isotactic butene-1 homopolymers or copolymers. The polymers and copolymers intended to be within the scope of the present invention are preferably suitably crystallizable thermoplastic butene-1 polymers with a number average molecular weight above 15,000, preferably above 20,000 and an isotactic content above 85%, preferably above 90%, and most preferably above 95%, as determined by conventional methods.

Suitable isotactic butene-1 polymers and copolymers are commercially available from the Shell Oil Company and methods for their preparation are well known in the art, see U.S. Pat. No. 3,362,940. Illustrative of butene-1 polymers suitable for use in the present invention are those known in the industry as pipe grades. Particularly preferred are Shell butene-1 homopolymers.

The hindered amine ultraviolet (U.V.) stabilizer employed herein are disclosed in Japanese Patent No. Sho 60[1985]-124642 and in Japanese Patent No. Sho 60[1985]-130635 and have at least one of the following general formulas:

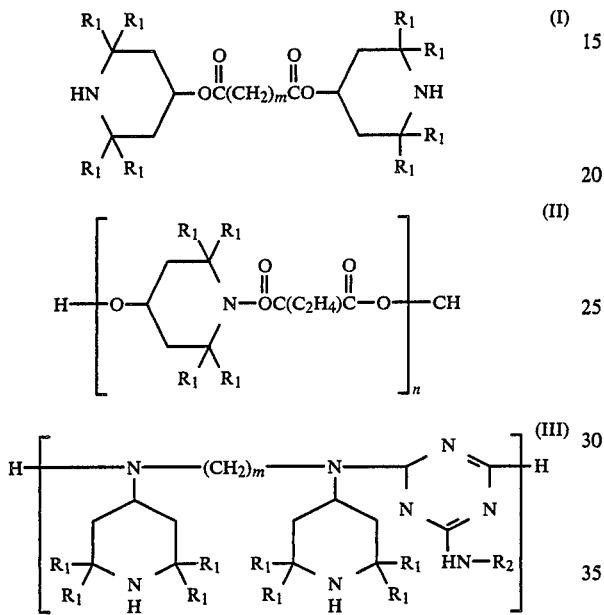

where R1 and R2 refer to alkyl groups containing 1–18 and 1–8 alkyl groups respectively; m and n are integers of 0–30 and 1–40, respectively.

A particular hindered amine which can be used within the scope of this invention is N,N'-bis(2,2,6,6-tetramethyl-4-piperidinyl)-1,6-hexane diamine polymer with 2,4,6-trichloro-1,3,5-triazine and 2,4,4-trimethyl-1,2-pentanamine.

The most preferred hindered amine for use within the scope of this invention is represented by general formula (III), wherein R1 represents an alkyl group containing 1 alkyl group, R2 represents an alkyl group containing 5 alkyl groups, n is an integer of at least 4, and m is the integer 6. This preferred hindered amine is commercially known as Chimassorb ®944, and is available from Ciba-Geigy Corporation. Chimassorb is usually used as a light stabilizer. However, in this context, the Chimassorb is being used as a thermal stabilizer.

A hindered phenolic stabilizer/antioxidant is used herein. Numerous hindered phenolic stabilizers which would work in the present inventive blend are mentioned in Japanese Kokai Patent No. Sho 59[1984]-221344. Particular high molecular weight hindered phenolic stabilizers which work well within the scope of the present invention include Ethanox ®330 which is 1,3,5-trimethyl-2,4,6-tris(3,5-di-tert-butyl-4-hydroxy-benzyl)benzene, Irganox 1076 octadecyl 3,5-di-tert-butyl-4-hydroxyhydrocinnamate, Irganox ®1010 which is tetrakis[methylene(3,5-di-tert-butyl-4-hydroxy-hydro-cinnamate)]methane, Cyanox ®1790 which is 1,3,5-tris(4-tert-butyl-3-hydroxy-2,6-dimethylbenzyl)-1,3,5-triazine-2,4,6-(1H,3H,5H)-trione, Hostanox ®03 which is bis-[3,3-bi(4'hydroxy-3'tert.butyl-phenyl)-butanoic acid]-glycolester, Goodrite ®3114 which is tris(3,5-di-t-butyl-4-hydroxy-benzyl)isocyanurate;

Ethanox ®330 (molecular weight 775) is available from the Ethyl Corporation, Irganox ®1076 (molecular weight 531) and Irganox ®1010 (molecular weight 1178) are available from Ciba-Geigy Corporation. Cyanox ®1790 (molecular weight 700) is available from American Cyanamid Corporation. Hostanox ®03 (molecular weight 790) is available from American Hoechst Corporation and Goodrite ®3114 (molecular weight 785) now known as Irganox ®3114 is currently available from Ciba-Geigy Corporation.

The nucleating agent useful within the scope of the present invention can be a member of the group consisting of:
high density polyethylene,
graphitic non-turbostatic carbon;
fatty acid amides;
anthraquiones; and
amides.

A variety of preferred nucleating agents, preferred pigments and preferred fillers, contemplated for use in this invention are detailed in U.S. Pat. No. 4,576,983 which is assigned to the same company as the instant invention.

Other nucleating agents are also contemplated for use in this invention include graphitic non-turbostatic carbon nucleating agents, disclosed in U.S. Pat. No. 4,321,334 (having common assignee) and fatty acid amide nucleating agents disclosed in U.S. Pat. No. 4,322,503 (having common assignee). These fatty acid amides include N,N'-ethylene-bis-stearamide. Specific anthraquinones include 1,2-dihydroxy-9,10-anthraquinone; 1,4-dihydroxy-9,10-anthraquinone; 1,5-dihydroxy-9,10-anthraquinone; 12,5,8-tetrahydroxy-9-10-anthraquinone; 9,10-anthraquinone; and sodium 2-anthraquinone sulfonate. Other amide nucleating agents are disclosed in U.S. Pat. No. 4,320,209 (having common assignee). Preferred amides include 1-napthalene acetamide; N-stearoyl-p-aminophenol; mercapto-N-2-naphthyl-acetamide; malonamide; nicotinamide; isonicotinamide; and 1,8-naphthalimide.

The most preferred nucleating agent is high density polyethylene. The high density polyethylene (HDPE) employed in the composition of this invention is characterized by a density above about 0.93 g/cc and preferably at least about 0.95 g/cc. An HDPE with a melt index of from about 0.1 to 20, as measured by ASTM D1238, Condition E, is typically employed; HDPE of higher melt index may also be suitable. The melt index and molecular weight of HDPE are inversely related; the corresponding molecular weight for a polymer with a given melt index may be readily determined by routine experimentation. A particularly suitable HDPE, for example, has a melt index of 0.45 g/10 min., a weight average molecular weight of about 166,000 and a density of 0.950 grams/cm$^3$. A high density polyethylene with a viscosity at mixing temperatures approximating that of the butene-1-homopolymer facilitates intimate mixing in conventional extrusion compounding equipment. A wide variety of suitable high density polyethylenes are commercially available and methods for their preparation are well known in the art. They may be prepared by polymerization processes employing Ziegler-type coordination catalysts or supported chromium oxide catalysts. Commercially available HDPE of either type is suitable.

The filler component employed in this invention is preferably a coated mineral filler, in particular a magnesium silicate coated with an acid acceptor. The preferred magnesium silicate is talc. The acid acceptors which are coated on the mineral filler are preferably stearates of weak bases, such as alkaline earth metal stearates. A preferred acid acceptor is zinc stearate. Accordingly, the preferred filler component is zinc stearate-coated talc. Such materials are well known, commercially available fillers.

In addition to adding certain strength properties to the composition of the invention, the particular fillers employed herein also unexpectedly improve the long term stability of the blends.

Pigments are added as desired to achieve a particular color for the resin. Typical pigments useful within the scope of the invention include carbon black, titanium dioxide and iron oxide.

The relative amounts of each of the various ingredients in the polymeric composition of the present invention, are listed below in percent by weight (the total for a particular composition adding up to 100 percent):

| COMPONENT | EX1 | EX2 | EX3 |
|---|---|---|---|
| butene-1 homopolymer, or copolymer | 93–99.5 | 93–99.5 | 95–99.5 |
| hindered amine | 0.05–0.5 | 0.10–0.4 | 0.15–0.3 |
| at least one hindered phenolic stabilizer | 0.05–1.1 | 0.05–0.9 | 0.05–0.75 |
| nucleating agent | 0–0.5 | 0.05–0.4 | 0.1–0.2 |
| pigment | 0–4 | 0.0–3 | 0.0–2 |
| filler | 0–3 | 0–2 | 0.5–1.5 |

The relative amounts of the hindered amine and hindered phenolic component are significant to stabilize the resulting composition, that is, to provide both heat resistance to temperatures from 0° C. to 110° C., and more preferably from 23° C. to 100° C., U.V. resistance, chlorine resistance and processing stability due to the synergistic effects of these interacting components.

In the preferred embodiment, the various ingredients are blended or intimately mixed in an intensive mixing device, such as a C. W. Brabender ® Mixer/Measuring Head or a banbury-type mixer. The resulting blends have particular utility for carrying pressurized hot water in view of the long-term pressure capability of the resin and improved resistance to a loss of polymer properties resulting from heat, oxygenated hot water, aqueous chlorine destabilization and ultraviolet radiation. An important feature for a water carrying polymer is that the combination of ingredients that is used must not leach into the water supply. The combination chosen here is very resistant to leaching particularly in the presence of aqueous chlorine and hot water.

The invention is further illustrated by reference to the following Example, which is given for the purpose of illustration.

EXAMPLE

In this Example, eight formulations were prepared using the following combinations of ingredients:

| COMPONENT | F1 | F2 | F3 | F4 | F5 | F6 | F7 | F8 |
|---|---|---|---|---|---|---|---|---|
| PB (BR-200)* | 99.03 | 98.73 | 98.73 | 99.03 | 98.73 | 96.328 | 96.328 | 96.328 |
| Chimassorb 944 | 0.15 | 0.25 | 0.40 | 0.15 | 0.25 | 0.30 | 0.30 | 0.30 |
| Ethanox 330 | 0.30 | 0.40 | 0.25 | 0.30 | 0.40 | 0.20 | — | — |
| Irganox 1076 | 0.15 | 0.25 | 0.25 | — | — | — | 0.20 | — |
| Irganox 1010 | — | — | — | 0.15 | 0.25 | — | — | 0.20 |
| High density polyethylene | 0.10 | 0.10 | 0.10 | 0.10 | 0.10 | 0.20 | 0.20 | 0.20 |
| Titanium 02 | 0.25 | 0.25 | 0.25 | 0.25 | 0.25 | 1.70 | 1.70 | 1.70 |
| Carbon black | 0.008 | 0.008 | 0.008 | 0.008 | 0.008 | 0.06 | 0.06 | 0.06 |
| Zinc oxide | 0.012 | 0.012 | 0.012 | 0.012 | 0.012 | 0.012 | 0.012 | 0.012 |
| ZSC talc** | — | — | — | — | — | 1.20 | 1.20 | 1.20 |

*PB (BR-200) represents a particular polybutylene resin available from Shell Chemical Co.
**ZSC talc is zinc stearate coated talc.

The various formulations were prepared by mixing the ingredients in a brabender-type mixing head at 210° C. at 60 RPM for five minutes under nitrogen purge in order to avoid oxidative degradation. Each resin was then compression-molded into 60 mil thick plaque. After transformation in at least 10 days to a stable hexagonal crystal form I of polybutylene (PB), the plaques were tested. The test results follow:

| EFFECT OF HOT WATER AGING (110° C. WITH 25 ppm O2) OF 60-MIL PLAQUES ON THE LIFETIME OF EIGHT EXPERIMENTAL PB RESIN FORMULATIONS SHOWN ABOVE | | | | | | | | |
|---|---|---|---|---|---|---|---|---|
| Formulation # | F1 | F2 | F3 | F4 | F5 | F6 | F7 | F8 |
| Days to Fail | 53 | 66 | 66 | 40 | 40 | 40 | 32 | 19 |

What is claimed is:

1. A composition for a chlorinated hot water supplying pipe consisting essentially of a blend of
   (a) about 95.5 to about 99.5 percent by weight of said isotactic 1-butene homopolymer;
   (b) about 0.1 to about 0.4 percent by weight of N,N'-bis(2,2,6,6-tetramethyl-4-piperidinyl)-1,6-hexane diamine polymer with 2,4,6-trichloro-1,3,5-triazine and 2,4,4-trimethyl-1,2-pentanamine;
   (c) about 0.10 to about 0.90 by weight of said hindered phenolic thermal stabilizer having a molecular weight above 530 and selected from the group consisting of:
   1,3,5-trimethyl-2,4,6-tris(3,5-di-tert-butyl-4-hydroxybenzyl)benzene, octadecyl 3,5-di-tert-butyl-4-hydroxyhydrocinnamate, tetrakis[methylene(3,5-di-tert-butyl-4-hydroxy-hydro-cinnamate)]methane, 1,3,5-tris(4-tert-butyl-3-hydroxy-2,6-dimethylbenzyl)-1,3,5-triazine-2,4,6-(1H,3H,5H)-trione, bis-[3,3-bis(4'hydroxy-3'tert.butyl-phenyl)butanoic acid]-glycolester, tris(3,5-di-t-butyl-4-hydroxybenzyl)isocyanurate and mixtures thereof;

(d) about 0.05 to about 0.4 percent by weight of said nucleating agent;

(e) about zero to about 3 percent by weight of said pigment; and (f) about zero to about 2 percent by weight of said filler.

2. A composition for a chlorinated hot water supplying pipe consisting essentially of a blend of
 (a) about 95.5 to about 99.5 percent by weight of said isotactic butene-1 homopolymer;
 (b) about 0.15 to about 0.3 percent by weight of N,N'-bis(2,2,6,6-tetramethyl-4-piperidinyl)-1,6-hexane diamine polymer with 2,4,6-trichloro-1,3,5-triazine and 2,4,4-trimethyl-1,2-pentanamine;
 (c) about 0.4 to about 0.75 by weight of said hindered phenolic thermal stabilizer having a molecular weight above 530 and selected from the group consisting of:
 1,3,5-trimethyl-2,4,6-tris(3,5-di-tert-butyl-4-hydroxybenzyl)benzene, octadecyl 3,5-di-tert-butyl-4-hydroxyhydrocinnamate, tetrakis[methylene(3,5-di-tert-butyl-4-hydroxy-hydro-cinnamate)]methane, 1,3,5-tris(4-tert-butyl-3-hydroxy-2,6-dimethylbenzyl)-1,3,5-triazine-2,4,6-(1H,3H,5H)-trione, bis-[3,3-bis(4'hydroxy-3'tert.butyl-phenyl)-butanoic acid]-glycolester, tris(3,5-di-t-butyl-4-hydroxybenzyl)isocyanurate and mixtures thereof;
 (d) about 0.1 to about 0.2 percent by weight of said nucleating agent;
 (e) about 0.2 to about 2 percent by weight of said pigment; and
 (f) about 0.5 to about 1.5 percent by weight of said filler.

3. Pipes for carrying potable water having a temperature in the range of about 23° C. to about 100° C. which contain a polymeric composition consisting essentially of an intimate blend of:
 (a) about 95.5 to about 99.5 percent by weight of an isotactic butene-1 homopolymer;
 (b) about 0.1 to about 0.4 percent by weight of N,N'-bis(2,2,6,6-tetramethyl-4-piperidinyl)-1,6-hexane diamine, polymer with 2,4,6-trichloro-1,3,5-triazine and 2,4,4-trimethyl-1,2-pentanamine;
 (c) about 0.1 to about 0.9 percent by weight of 1,3,5-trimethyl-2,4,6-tris(3,5-di-tert-butyl-4-hydroxybenzyl)-benzene and octadecyl 3,5-di-tert-butyl-4-hydroxyhydrocinnamate;
 (d) about 0.05 to about 0.4 percent by weight of a nucleating agent;
 (e) about zero to about 3 percent by weight of a pigment; and
 (f) about zero to about 2 percent by weight of a filler.

4. Pipes for carrying potable water having a temperature in the range of about 23° C. to about 100° C. which contain a polymeric composition consisting essentially of an intimate blend of:
 (a) about 95.5 to about 99.5 percent by weight of an isotactic butene-1 copolymer;
 (b) about 0.10 to about 0.4 percent by weight of said N,N'-bis(2,2,6,6-tetramethyl-4-piperidinyl)-1,6-hexane diamine polymer with 2,4,6-trichloro-1,3,5-triazine and 2,4,4-trimethyl-1,2-pentanamine;
 (c) about 0.10 to about 0.90 percent by weight of a hindered phenolic thermal stabilizer having a molecular weight above 530 and selected from the group consisting of:
 1,3,5-trimethyl-2,4,6-tris(3,5-di-tert-butyl-4-hydroxybenzyl)benzene, octadecyl 3,5-di-tert-butyl-4-hydroxyhydrocinnamate, tetrakis[methylene(3,5-di-tert-butyl-4-hydroxy-hydro-cinnamate)]methane, 1,3,5-tris(4-tert-butyl-3-hydroxy-2,6-dimethylbenzyl)-1,3,5-triazine-2,4,6-(1H,3H,5H)-trione, bis-[3,3-bis(4'hydroxy-3'tert.butyl-phenyl)-butanoic acid]-glycolester, tris(3,5-di-t-butyl-4-hydroxybenzyl)isocyanurate and mixtures thereof;
 (d) about 0.05 to about 0.4 percent by weight of a nucleating agent;
 (e) about zero to about 3 percent by weight of a pigment; and
 (f) about zero to about 2 percent by weight of a filler.

5. An improved polyolefin composition having improved resistance to deterioration in the presence of chlorinated water and improved resistance to water having a temperature in the range of about 23° C. to about 100° C., said composition consisting essentially of a blend of:
 (a) about 95.5 to about 99.5 percent by weight of an isotactic butene-1 homopolymer;
 (b) about 0.15 to about 0.3 percent by weight of N,N'-bis(2,2,6,6-tetramethyl-4-piperidinyl)-1,6-hexane diamine polymer with 2,4,6-trichloro-1,3,5-triazine and 2,4,4-trimethyl-1,2-pentanamine.
 (c) about 0.40 to about 0.75 percent by weight of a mixture of octadecyl 3,5-di-tert-butyl-4-hydroxyhydrocinnamate and 1,3,5-trimethyl-2,4,6-tris(3,5-di-tert-butyl-4-hydroxy-benzyl)-benzene;
 (d) about 0.1 to about 0.2 percent by weight of high density polyethylene;
 (e) about 0.2 to about 2.0 percent by weight of a mixture of carbon black and titanium dioxide; and
 (f) about 0.5 to about 1.5 percent by weight of a magnesium silicate coated with a metal stearate.

6. An improved polyolefin composition having improved resistance to deterioration in the presence of chlorinated water and improved resistance to water having a temperature in the range of about ambient temperature to about 23° C. to about 100° C., said composition consisting essentially of a blend of:
 (a) about 95.5 to about 99.5 percent by weight of an isotactic butene-1 copolymer;
 (b) about 0.05 to about 0.5 percent by weight of N,N'-bis(2,2,6-6-tetramethyl-4-piperidinyl)-1,6-hexane diamine polymer with 2,4,6-trichloro-1,3,5-triazine and 2,4,4-trimethyl-1,2-pentanamine.
 (c) about 0.4 to about 0.75 percent by weight of a mixture of octadecyl 3,5-di-tert-butyl-4-hydroxyhydrocinnamate and 1,3,5-trimethyl-2,4,6-tris(3,5-di-tert-butyl-4-hydroxy-benzyl)-benzene;
 (d) about 0.1 to about 0.2 percent by weight of high density polyethylene;
 (e) about 0.2 to about 2.0 percent by weight of a mixture of carbon black and titanium dioxide; and
 (f) about 0.5 to about 1.5 percent by weight of a magnesium silicate coated with a metal stearate.

* * * * *